US009589066B2

(12) United States Patent
Brugler et al.

(10) Patent No.: US 9,589,066 B2
(45) Date of Patent: Mar. 7, 2017

(54) SYSTEM, METHOD, AND COMPUTER PROGRAM PRODUCT FOR GENERATING A REPRESENTATIVE VIEW FOR A MULTIPAGE COMPILATION OF INFORMATION

(75) Inventors: Thomas Stanton Brugler, Fuguay-Varina, NC (US); Todd Michael Eischeid, Cary, NC (US); Mark E. Molander, Cary, NC (US); Kerry A. Ortega, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2249 days.

(21) Appl. No.: 12/360,055

(22) Filed: Jan. 26, 2009

(65) Prior Publication Data

US 2010/0192087 A1    Jul. 29, 2010

(51) Int. Cl.
*G06F 17/00*    (2006.01)
*G06F 17/30*    (2006.01)

(52) U.S. Cl.
CPC .............................. *G06F 17/30905* (2013.01)

(58) Field of Classification Search
CPC ......... G06F 17/30864; G06F 17/30867; G06F 17/30011; G06F 17/30477; G06F 17/30554; G06F 17/30882; G06F 3/0483; G06F 17/3053; G06F 17/30572; G06F 17/3064; G06F 17/30716
USPC ........ 715/206, 254, 277, 712, 713, 783, 788
See application file for complete search history.

(56) References Cited

U.S. PATENT DOCUMENTS

| | | | |
|---|---|---|---|
| 5,867,164 A * | 2/1999 | Bornstein | G06F 17/211 |
| | | | 715/236 |
| 6,747,674 B1 * | 6/2004 | Asami | 715/721 |
| 6,907,422 B1 * | 6/2005 | Predovic | |
| 7,159,188 B2 | 1/2007 | Stabb et al. | 715/787 |
| 7,676,759 B2 * | 3/2010 | Carter | G06F 3/0485 |
| | | | 715/721 |
| 7,765,491 B1 * | 7/2010 | Cotterill | 715/833 |
| 7,882,450 B2 * | 2/2011 | Bornstein et al. | 715/854 |
| 2006/0015804 A1 | 1/2006 | Barton et al. | 715/503 |
| 2006/0218483 A1 | 9/2006 | Weitzman et al. | 715/503 |
| 2006/0225001 A1 | 10/2006 | Sylthe et al. | 715/864 |
| 2007/0078877 A1 | 4/2007 | Ungar et al. | 707/101 |
| 2007/0168514 A1 | 7/2007 | Cocotis et al. | 709/225 |
| 2008/0046803 A1 | 2/2008 | Beauchamp et al. | 715/212 |
| 2008/0109762 A1 * | 5/2008 | Hundal et al. | 715/855 |
| 2008/0222552 A1 * | 9/2008 | Batarseh | G09B 5/02 |
| | | | 715/776 |
| 2008/0244379 A1 | 10/2008 | Busse et al. | 715/227 |
| 2008/0256014 A1 * | 10/2008 | Gould et al. | 706/48 |
| 2009/0100021 A1 * | 4/2009 | Morris et al. | 707/3 |
| 2009/0249217 A1 * | 10/2009 | Narayanaswami | 715/744 |
| 2010/0031190 A1 * | 2/2010 | Hall | G06F 17/30991 |
| | | | 715/806 |

\* cited by examiner

*Primary Examiner* — Di Xiao
(74) *Attorney, Agent, or Firm* — Zilka-Kotab, PC

(57) ABSTRACT

A method according to one embodiment includes outputting one page of a multipage compilation of information; receiving a request to show portions of multiple pages of the multipage compilation of information, the request originating from a user input device; selecting the portions of the multiple pages of the multipage compilation of information; generating a view having the selected portions; and outputting the view to a graphical display device.

20 Claims, 11 Drawing Sheets

There are 5,594 homes for sale in the target area

Search results page 1 of 339

Sort results by:
    Price    Bedrooms    Lot Size $34,900
1 Bed, 1 Bath    Raleigh, NC 27610
691 Sq. Ft.
0.06 Acres Property Type: Single Family Home
Single Family Property, Area: Raleigh, Subdivision: Southpark, County: Wake, Approximately 0.06 acre(s), Year Built: 1973 ... View details.

$40,000
1 Bed, 1 Bath    Raleigh, NC 27601
644 Sq. Ft.
0.06 Acres

Property Type: Single Family Home
Single Family Property, Area: Raleigh, Subdivision: South Park, County: Wake, Approximately 0.06 acre(s), Year Built: 1959 ... View details.

$47,000
1 Bed, 1 Bath    Raleigh, NC 27610
576 Sq. Ft.
0.04 Acres

Property Type: Single Family Home
Single Family Property, Area: Raleigh, Subdivision: College Park, County: Wake, Approximately 0.04 acre(s), Year Built: 1930, Single ... View details.

Pages: 1 2 3 4 5 6 ... 14 339 Next ▶ Preview

Go to page: [   ]    806

SYSTEM, METHOD, AND COMPUTER PROGRAM PRODUCT FOR GENERATING A REPRESENTATIVE VIEW FOR A MULTIPAGE COMPILATION OF INFORMATION

BACKGROUND

The present invention relates to generating views, and more particularly, this invention relates to generating a representative view for a multipage compilation of data.

When using paging tables to show information, many users find it unusable and very slow to find particular items or groups of items in a paging table. Typical users would rather scroll through the table until the relevant content is found. But scrolling through tables typically presents problems when dealing with large quantities of information. If the user knows what he or she is looking for, he or she can search or filter the table. But if the user wants to look at data in a certain part of the table, it is difficult to know which page of rows to look at. One method is to provide a simple set of links based on a field in the table (like alphabetic links), but that may not provide enough information to guide the user to the preferred page.

What is therefore needed is a way to view summarized information from the table or other multi-page collection of data.

SUMMARY

A method according to one embodiment includes outputting one page of a multipage compilation of information; receiving a request to show portions of multiple pages of the multipage compilation of information, the request originating from a user input device; selecting the portions of the multiple pages of the multipage compilation of information; generating a view having the selected portions; and outputting the view to a graphical display device.

A computer program product for generating a view according to one embodiment includes a computer usable medium having computer usable program code embodied therewith. The computer usable program code comprises computer usable program code configured to output one page of a multipage compilation of information; computer usable program code configured to receive a request to show portions of multiple pages of the multipage compilation of information; computer usable program code configured to select the portions of the multiple pages of the multipage compilation of information; computer usable program code configured to generate a view having the selected portions; and computer usable program code configured to output the view.

A method according to yet another embodiment includes outputting one page of a multipage compilation of information; receiving a request to show portions of multiple pages of the multipage compilation of information, the request originating from a user input device; selecting the portions of the multiple pages of the multipage compilation of information; generating a view having the selected portions; outputting the view to a graphical display device; receiving selection of an item in the view, and performing an action associated with selection of the item. The request includes at least one of:
  an indication of the particular portions to select by designating at least one of: an interval of the pages from which to select the portions; an interval of the portions in the multipage compilation; and specific portions; and
  a fractional indication of how many portions to select relative to all portions in the multipage compilation.

A computer program product for generating a view according to yet anther embodiment includes a computer usable medium having computer usable program code embodied therewith. The computer usable program code comprises computer usable program code configured to output one page of a multipage compilation of information; computer usable program code configured to receive a request to show portions of multiple pages of the multipage compilation of information, the request originating from a user input device; computer usable program code configured to select the portions of the multiple pages of the multipage compilation of information; computer usable program code configured to generate a view having the selected portions; computer usable program code configured to output the view to a graphical display device; computer usable program code configured to receive selection of an item in the view, and performing an action associated with selection of the item. The request includes at least one of:
  an indication of the particular portions to select by designating at least one of: an interval of the pages from which to select the portions; an interval of the portions in the multipage compilation; specific portions; and
  a fractional indication of how many portions to select relative to all portions in the multipage compilation.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 4 depicts a first page of a table according to one embodiment.

FIG. 5 depicts a view of content from all pages of the table of FIG. 4 according to one embodiment.

FIG. 6A depicts a view of content from the first and every fifth page of a table according to one embodiment.

FIG. 6B depicts a view of content from the first and every fifth page of a table according to one embodiment.

FIG. 7 depicts a view of content selected from the view of FIG. 6B according to one embodiment.

FIG. 8 depicts a first page of a web search result according to one embodiment.

FIG. 9 depicts selection of content from the search on the first page of the web search result of FIG. 8 according to one embodiment.

FIG. 10 depicts a first page of a table according to one embodiment, the first page including a slider.

DETAILED DESCRIPTION

Figure 1:
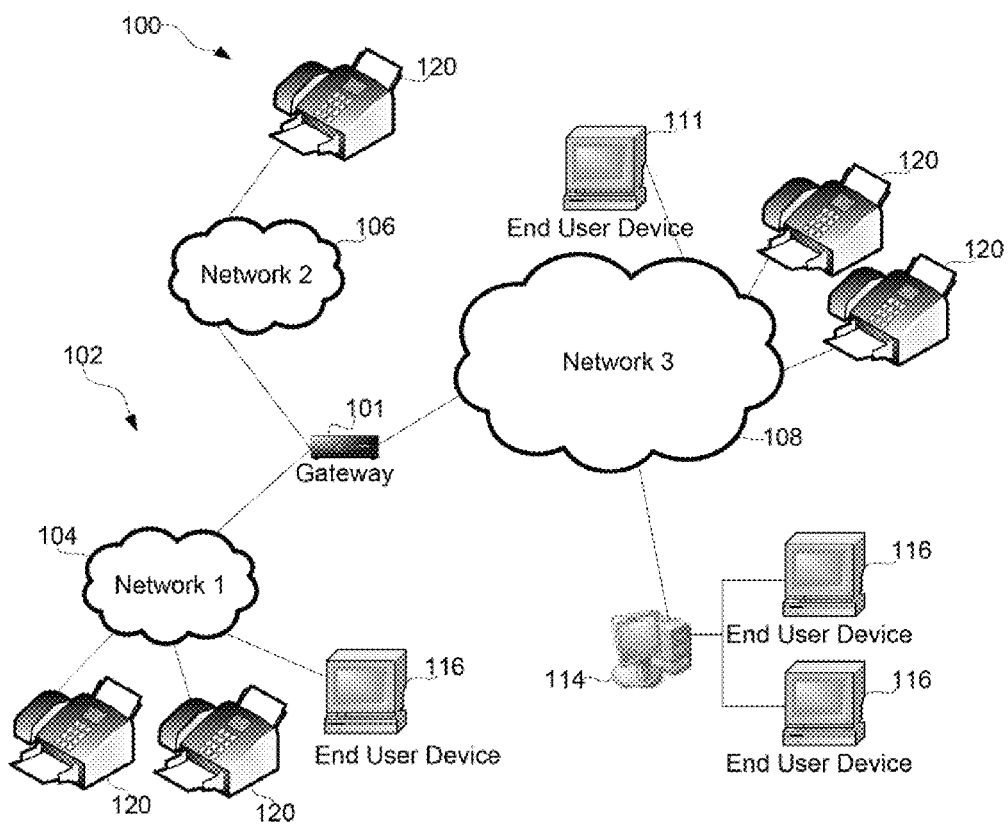
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of systems and methods for providing a summarized or partial view of content from multiple pages of a multipage compilation of information in a single page.

In one general embodiment, a method and a computer program product for generating a view are provided. The method includes outputting one page of a multipage compilation of information. By "multipage compilation of information" what is meant is a compilation of information that is parsed into and/or presented in several pages.

Illustrative examples of multipage compilations of information are presented herein. A request to show portions of multiple pages of the multipage compilation of information is received, the request originating from a user input device such as a mouse, keyboard, microphone, etc. The portions of the multiple pages of the multipage compilation of information are selected. A view having the selected portions is generated and output to a graphical display device.

In another general embodiment, a method and a computer program product for generating a view are provided. The method includes outputting one page of a multipage compilation of information; receiving a request to show portions of multiple pages of the multipage compilation of information, the request originating from a user input device; selecting the portions of the multiple pages of the multipage compilation of information; generating a view having the selected portions; outputting the view to a graphical display device; receiving selection of an item in the view, and performing an action associated with selection of the item. The request may include at least one of: an indication of the particular portions to select by designating at least one of an interval of the pages from which to select the portions; an interval of the portions in the multipage compilation; specific portions. The request may also or alternatively include a fractional indication of how many portions to select relative to all portions in the multipage compilation.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer. memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, PSTN, internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A facsimile machine 120 or series of facsimile machines 120 may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

Figure 2:
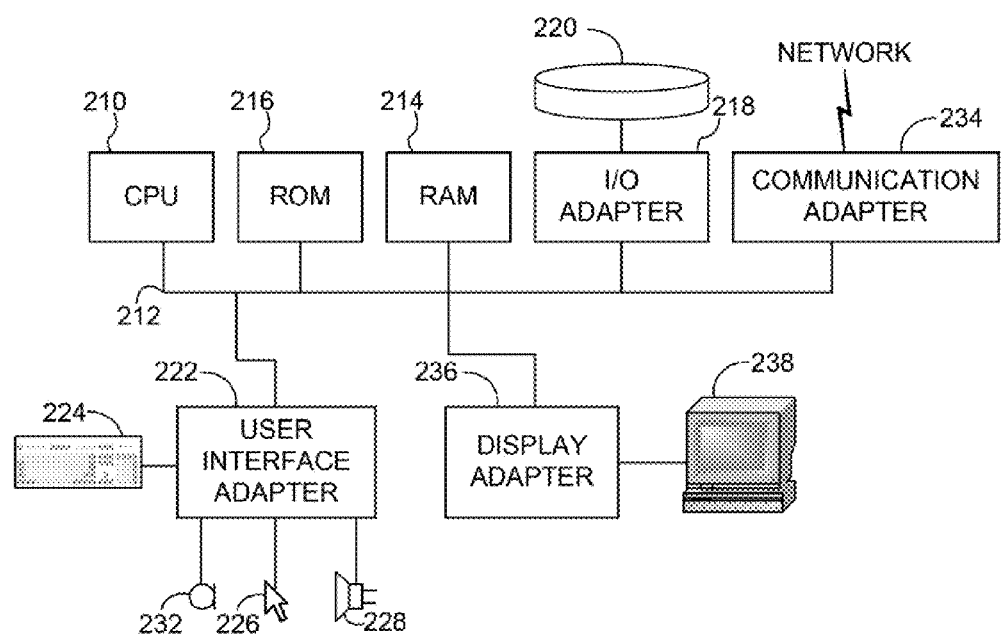
FIG. 2 shows a representative hardware environment that may be associated with the servers and/or clients of FIG. 1, in accordance with one embodiment.

FIG. 2 shows a representative hardware environment associated with a user device 116 of FIG. 1, in accordance with one embodiment. Such figure illustrates a typical hardware configuration of a workstation having a central processing unit 810, such as a microprocessor, and a number of other units interconnected via a system bus 812.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, or UNIX operating system. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
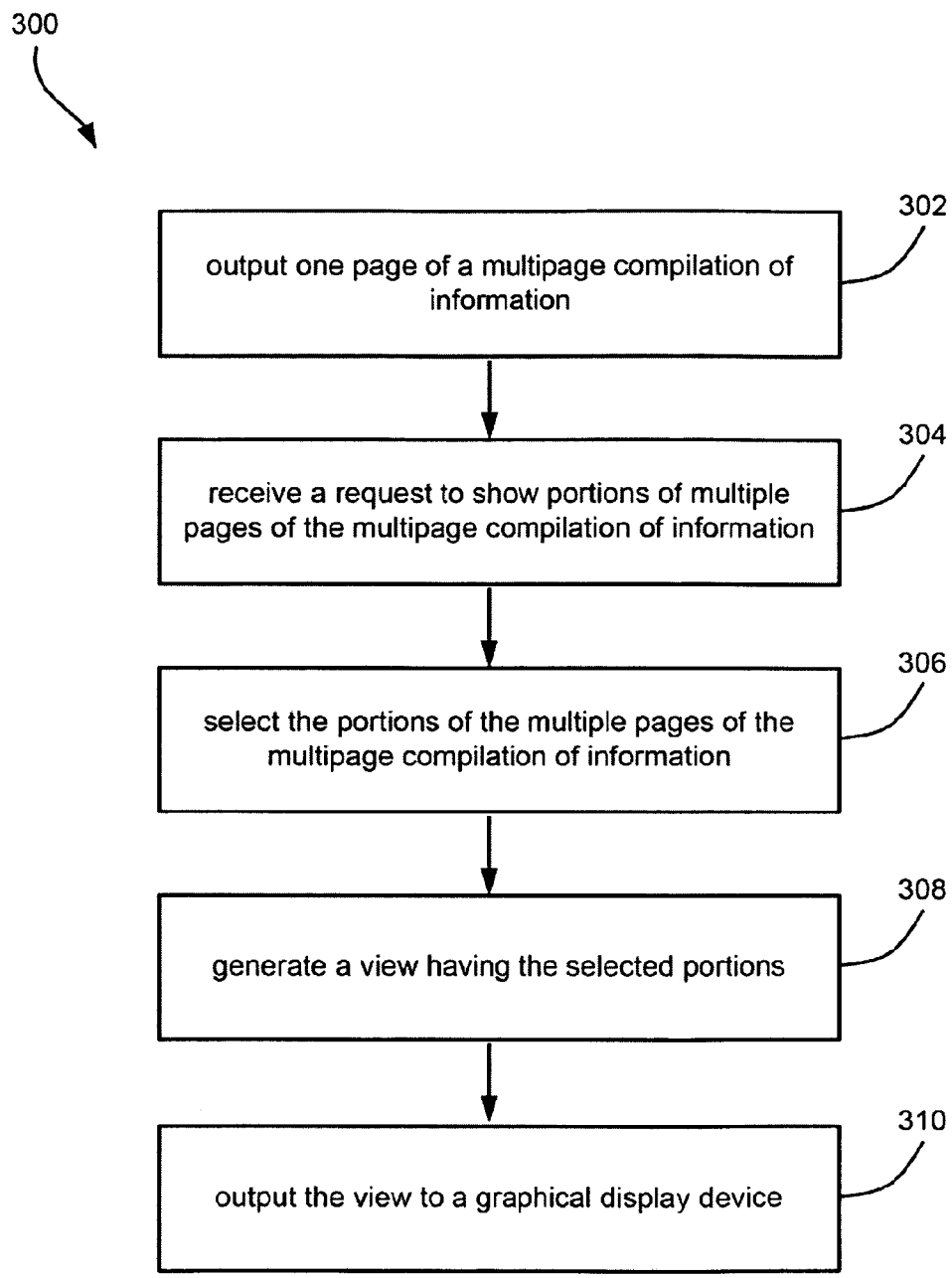
FIG. 3 depicts a method according to one embodiment.

FIG. 3 depicts a method 300 according to one embodiment. As shown, one page of a multipage compilation of information is output in operation 302.

The multipage compilation of information may be any compilation of data parsed into or spanning several pages, larger than will fit in a given (e.g., standard) screen size, etc. For instance, as shown in an example discussed below, the multipage compilation may be a search result. For example, this may be a result of an Internet search, database query, etc. In another example, described below, the multipage compilation of information may be a table such as a spreadsheet, report, etc. In further approaches, the multipage compilation of information may include a set of forms such as transactional forms, real estate forms, etc.; a series of messages in a discussion group posting or chat room; a series of web pages; etc.

In operation 304, a request to show portions of multiple pages of the multipage compilation of information is received. Typically, the request will originate from a user input device, e.g., via mouse click, keyboard input, etc., but may originate from another source.

In operation 306, the portions of the multiple pages of the multipage compilation of information are selected. Which portions are selected from the various pages may be provided by default, be based on user input or settings, etc. In one approach, the selected portions include a first row of each of the pages. In another approach, every nth line is selected for display. Further illustrative approaches are set forth below.

In operation 308, a view having the selected portions is generated. The view shows only the selected portions, thereby providing a high level or summarized view of the contents in the compilation.

In operation 310, the view is output to a graphical display device, e.g., directly to a graphical display device, to a computer coupled to a graphical display device, etc. In one approach, the selected portions are output in the view in a same graphical manner as they are output on the page associated therewith when the associated page is output. In a table, for example, the selected rows may be output in the same format, and containing the same information, that they would have if the page they are on is viewed in its entirety. Note, though, that in other approaches, a subset of the data may be shown in the view. For example, only the first few cells of each selected row may be shown. Moreover, the portions may be reformatted for presentation in the view.

Figure 4:
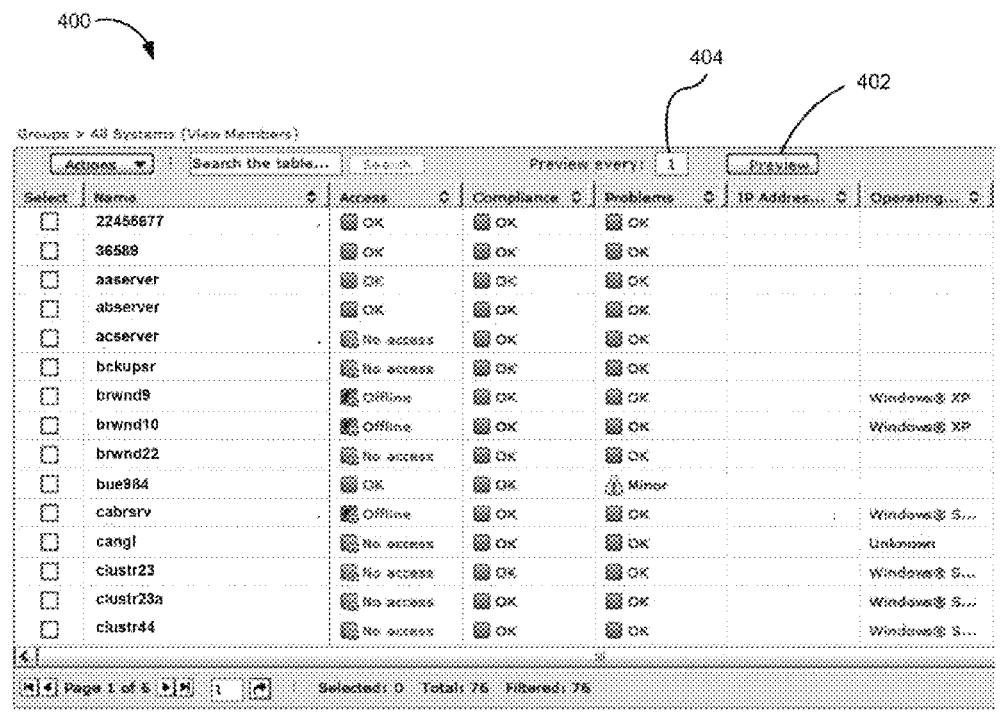

The following description will graphically describe several methods of use. For example, FIG. 4 shows the first page 400 of a typical multi-page table, the table in this case having 6 pages. As shown, the entries in the table are currently sorted by name in the Name field. The different items that would appear on pages 2-6 of the table remain unknown. Selection of the preview button 402 allows the user to see various entries from the displayed and nondisplayed pages of the table. The preview request may include an indication of the particular portions to select. in the example shown in FIG. 4, note that the "Preview every" field 404 has a "1" entered therein, which may be a default value. This indicates that the first entry on each page should be shown in the preview view.

Figure 5:
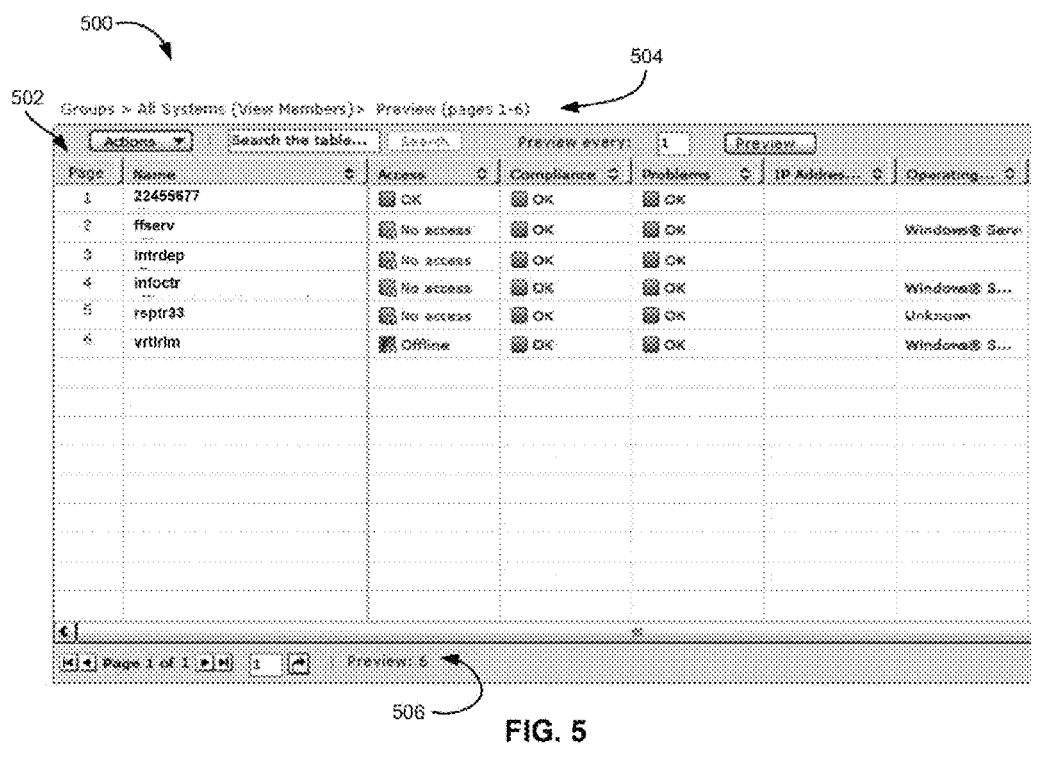

Referring to FIG. 5, the view 500 output upon selection of the preview button is shown. In FIG. 5, the selected column is replaced by the Page column 502 to give the user an indication they are in preview mode. Any table breadcrumbs may also change, as may the table status information 506 at the bottom of the table. Now the table contains the first item of each page. Accordingly, because the items were sorted by name, the user can estimate the range of values, for example, on page 2 of the table by looking at the first entry of page 2 and the first entry of page 3.

An alternate to showing selected entries may be to show multiple items on a page; for example the first, middle and last items of each page may be shown, rather than just the first item.

In a further approach, selecting the portions of the multiple pages of the multipage compilation includes selecting a maximum number of portions for the view, the portions being located at about uniform intervals in the multipage compilation. For example, as shown in FIG. 6B the system may select a line from every $5^{th}$ page in order to show portions at spaced intervals across the multipage compilation.

Selection of an item in the view may be received, e.g., by detecting a mouse click on the item. An action associated with selection of the item may be performed or executed. In one approach, the entries have the same functionality in the view as they do in the table view. For example, if the item is linked to another page, the page may be output upon receiving selection of the item. In another embodiment, selection of the item may launch an application. In a further embodiment, selection of the item may cause the associated page to be output. Thus, in FIG. 5, detecting selection of a page number in the Page column causes that page to be output, the user now having an indication of what items may be on the selected page.

Figure 6A:
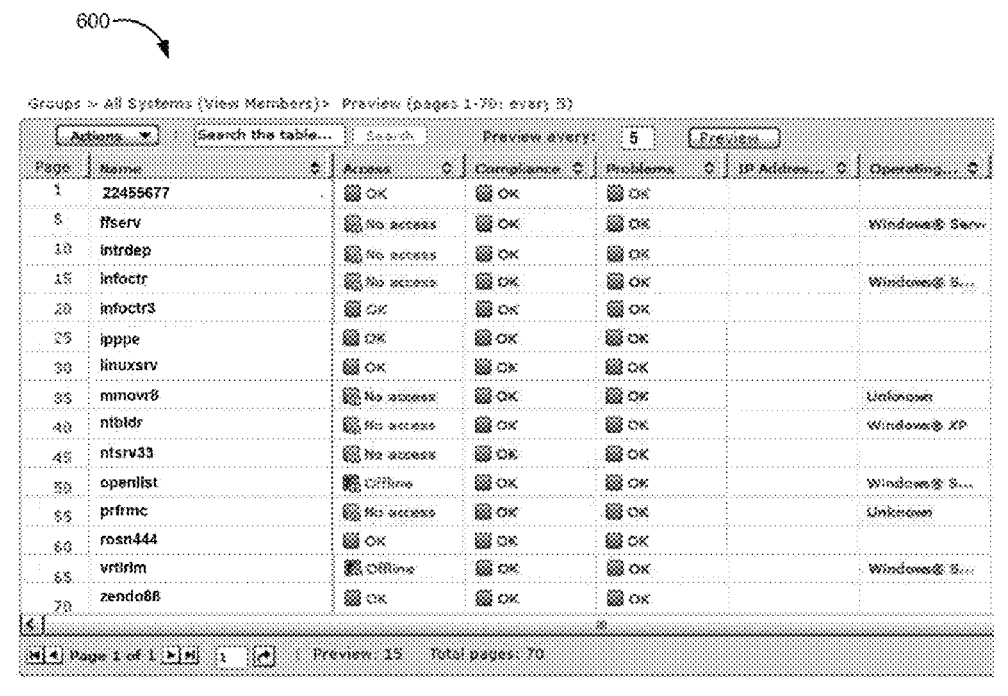
Figure 6B:
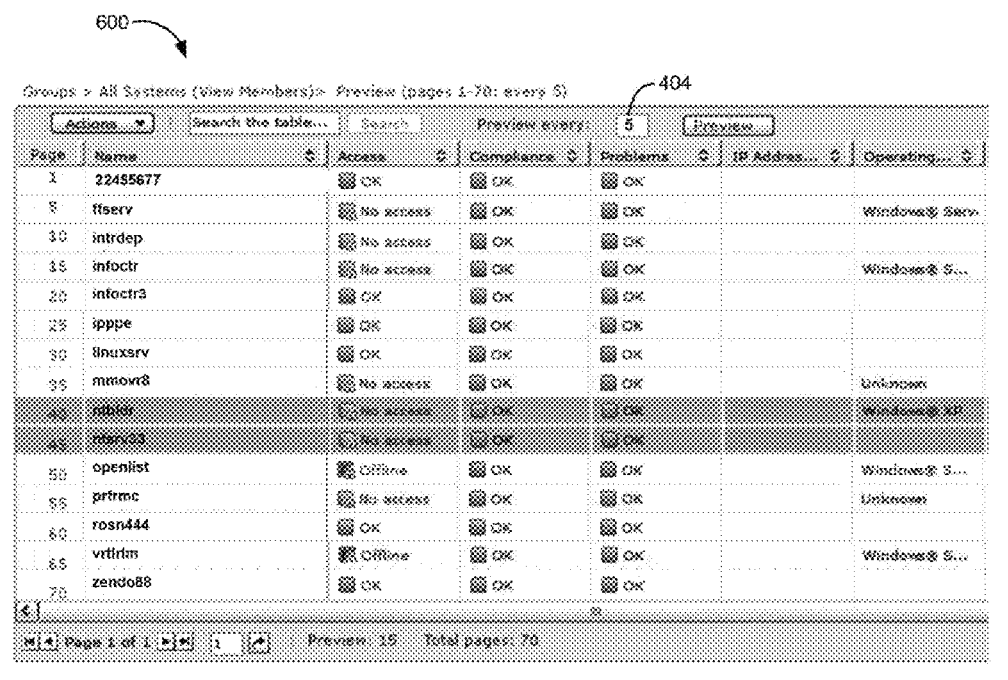

In FIG. 6A, there is shown a view 600 for a large number of pages. In this case even showing 70 items would result in a number of pages of views. Accordingly, the "Preview every" field 404 allows the user to show every x pages. As an option, the value may be automatically selected to fit one page worth of information in the view. In this case it set it to show a selection from every 5th page. The user may change this number to something else to see more or less pages in the view or views. Thus, the request may include an indication of the particular portions to select. For example, in a variation of the embodiment shown in FIG. 6A, the user may designate a portion (e.g., top line) of every 4th page of the table to be shown in the view.

The user can also select a range of items and then show more pages in that range. In FIGS. 6-9, it is shown that the user may select a range of pages from which portions will be selected for output in the view. For example, in FIG. 6B, the user has selected the items for page 40 and page 45 in the view 600. The "Preview every" field 404 is changed from 5 (as shown) to 1 and the Preview button is selected, which causes the view 700 of FIG. 7 to be output.

Figure 7:
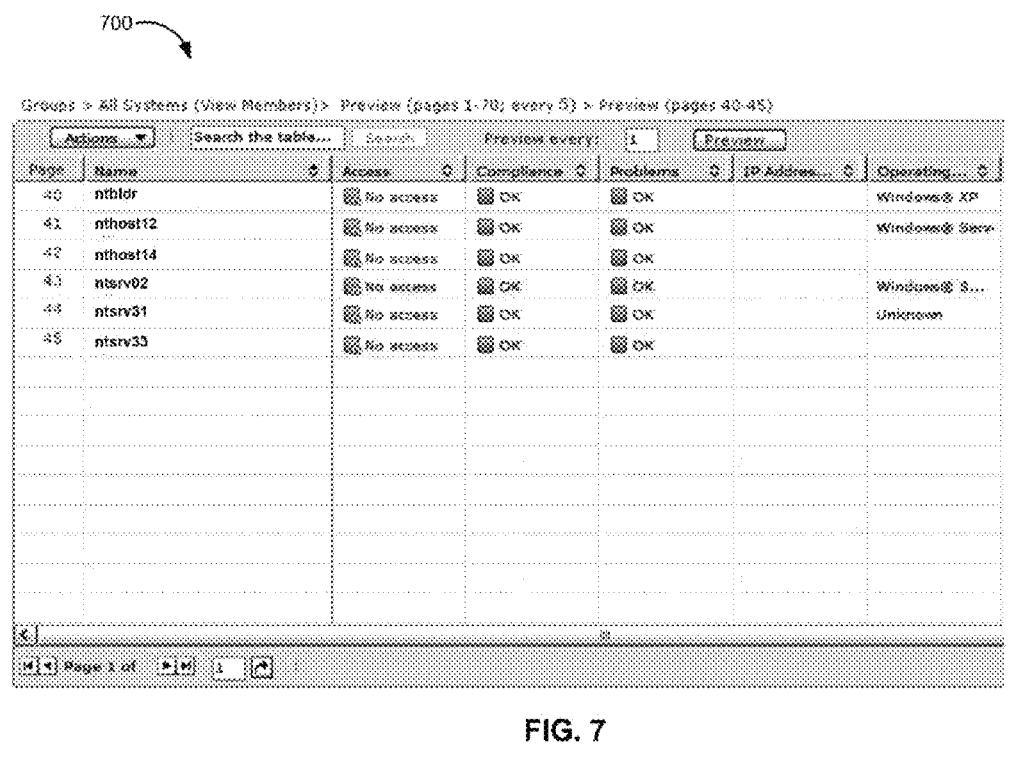

In FIG. 7, the user can now see what is on pages 40-45 of the table. A new breadcrumb may be added to allow the user to navigate back to the prior preview of back to all of the items.

Another preview option may be to optimize the initial table presentation to fill all of its viewable rows with the widest spread between pages, yet constrained to the number of rows viewable. FIG. 6 shows such an optimized preview, but it is. also anticipated that this could be a default presentation, or not hard-coded to a selectable number such as 3 or 4. For example, it may be another preview selection such as "Optimize spread", which also might make a good default, as it would give the user a full and wide view, from which to drill down further.

Figure 8:
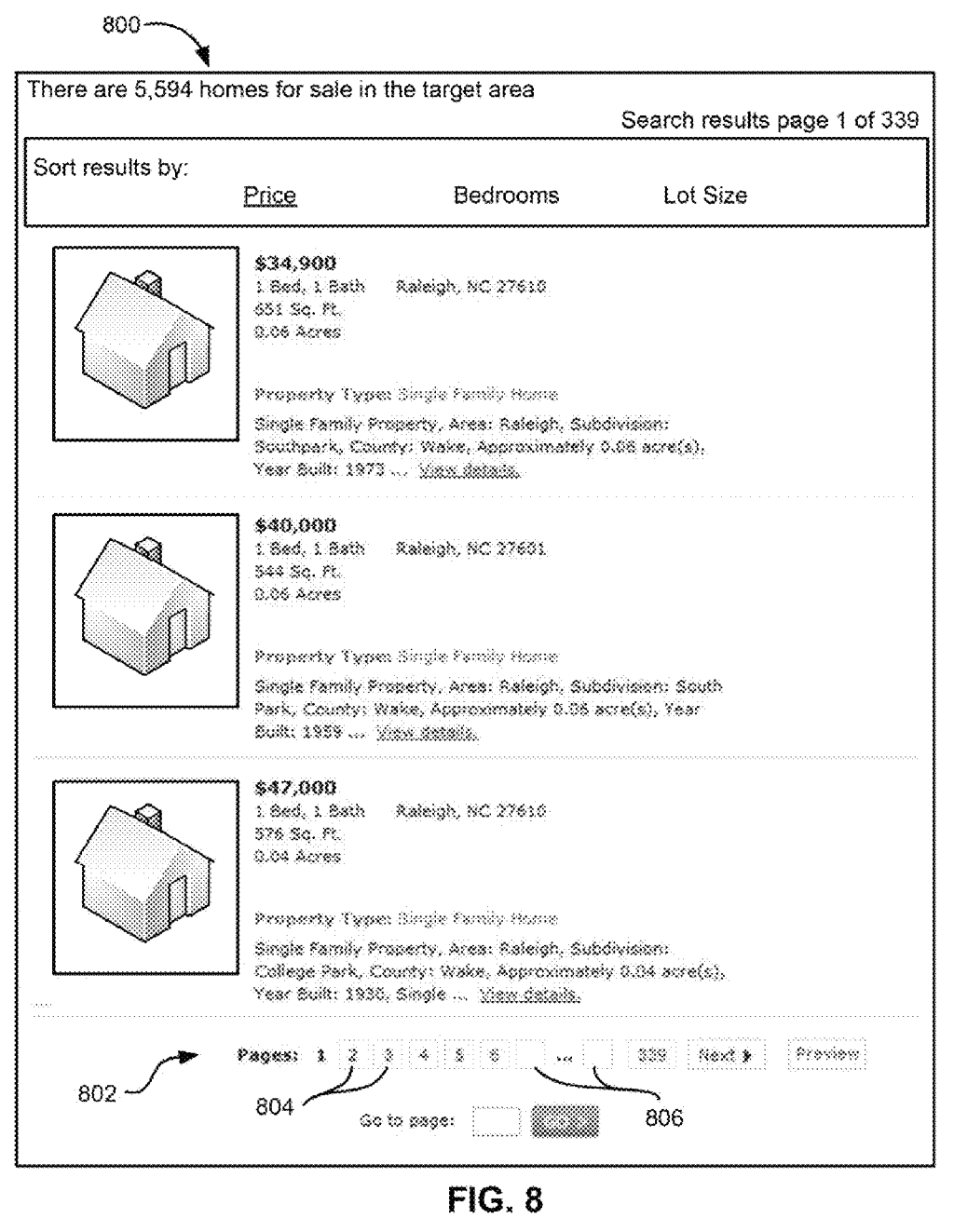

FIGS. 8-9 show an embodiment for generating a view of selected web pages. FIG. 8 shows a first page 800 of a typical web search result, sorted by price, and having a "list of pages" 802 at the bottom. Approaches similar to those set forth above with respect to FIGS. 3-7 may be used to generate summary views of the multiple pages of search results.

In one approach, the user can perform some action such as alt+click on one or more of the page icons 804 to select multiple pages to preview, and then select the Preview button. Upon detecting such selection, a view showing portions of the pages in the range may be generated.

As an option, entry fields 806 may be added to allow the user to type in values. For example, suppose the user wants to see a preview of pages 5-14, as shown in FIG. 9, the user can type the value 14 in one of the entry fields 806 and then alt+click page 5, and then click the Preview button. The listing would be replaced with entries from page 5 through 14. In another approach, the user may enter the preview range within the entry fields (e.g. 5-14) and then click the Preview button.

Figure 10:
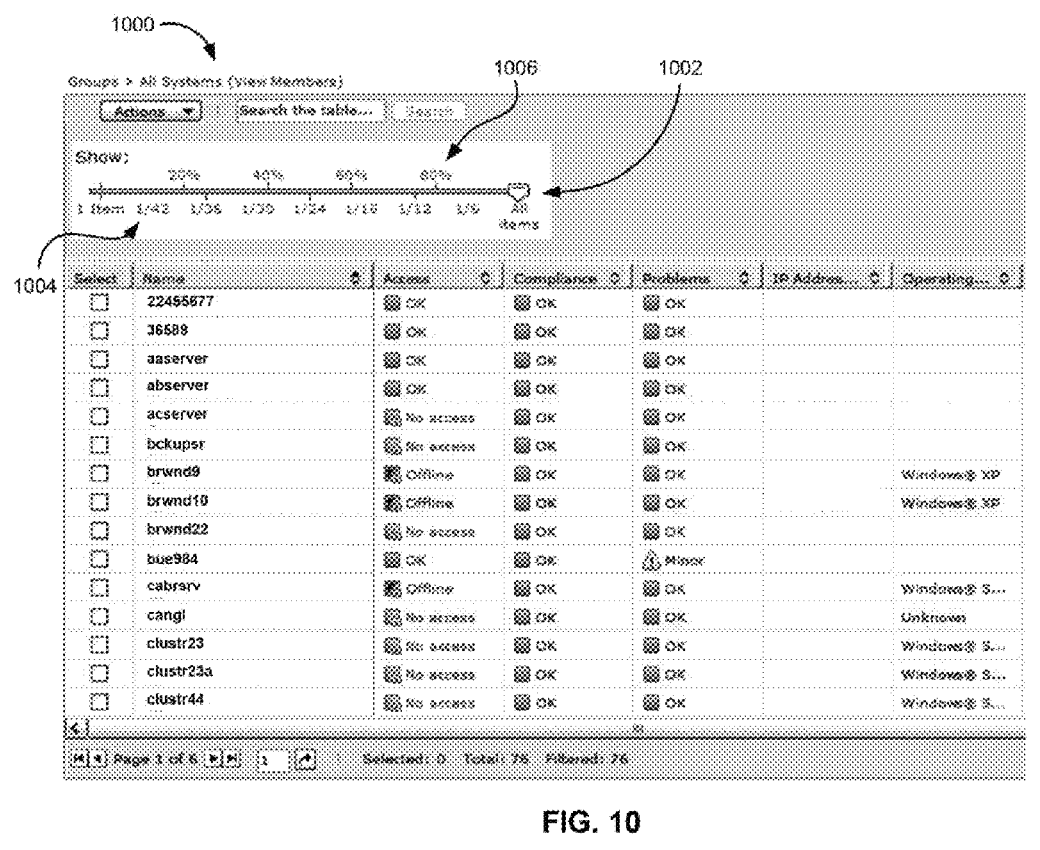

FIG. 10 shows an embodiment 1000 having a slider control 1002 that provides control over view generation. The slider may blend together the preview and normal modes; e.g., showing all items (in the 'normal' mode) becomes just a point on the continuum along with the other 'preview' modes. In this variation the user does not need to care about exact values for 'preview every'; the user may simply want to expand or contract the granularity of the view. Each time manipulation of the slider is detected, the table contents may be updated. The left hand anchor may indicate the paging items that fit in a one page view. When looking at the preview, the user can select the item from a particular page and then expand it to show all items. The table at the current selection may then be output.

Thus, the preview request may include a fractional indication of how many portions to select relative to all portions in the multipage compilation. For example, as shown in FIG. 10, the slider allows the user to indicate which fraction 1004 of items to show, e.g., 1 of every 6, one of very 12, etc. As also shown in FIG. 10, the fractional indication may also be in terms of a percent 1006, e.g., 80% (=$^{80}/_{100}$).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
outputting one page of a multipage compilation of information;
receiving a request to show portions of multiple pages of the multipage compilation of information, the request originating from a user input device, the request including an indication of which portions of the multiple pages of the multipage compilation to select;
selecting the portions of the multiple pages of the multipage compilation of information according to the indication;
generating a view having the selected portions; and
outputting the view to a graphical display device,
wherein the selected portions output to the graphical display device include a first item, a middle item, and a last item of each of the multiple pages.

2. The method of claim 1, wherein the multipage compilation of information is a search result or includes multiple web pages.

3. The method of claim 1, wherein the multipage compilation of information is a multi-page table.

4. The method of claim 1, further comprising receiving selection of an item in the view, and performing an action associated with selection of the item, wherein the selected portions are output in the view in a same graphical manner as they are output on the page associated therewith when the page associated therewith is output.

5. The method of claim 1, wherein the request includes a fractional indication of how many portions to select relative to all portions in the multipage compilation, the fractional indication being shown on a slider, and wherein selecting the portions of the multiple pages of the multipage compilation includes selecting a maximum number of portions for the view, the portions being located at about uniform intervals in the multipage compilation.

6. The method of claim 1, wherein selecting the portions of the multiple pages of the multipage compilation includes selecting a maximum number of portions for the view, the portions being located at about uniform intervals in the multipage compilation.

7. The method of claim 1, wherein the request includes a fractional indication of how many portions to select relative to all portions in the multipage compilation.

8. The method of claim 1, wherein the selected portions comprise every nth line of each page of the multiple pages of the multipage compilation, and wherein the indication includes a value of n.

9. The method of claim 1, wherein selecting the portions of the multiple pages of the multipage compilation of information comprises selecting portions in a manner which creates a summary of the information of the multiple pages of the multipage compilation of information.

10. A computer program product for generating a view, the computer program product comprising:
a non-transitory computer usable medium having computer usable program code embodied therewith, the computer usable program code comprising:
computer usable program code configured to output one page of a multipage compilation of information;
computer usable program code configured to receive a request to show portions of multiple pages of the multipage compilation of information, the request including an indication of which portions of the multiple pages of the multipage compilation to select;
computer usable program code configured to select the portions of the multiple pages of the multipage compilation of information according to the indication;
computer usable program code configured to generate a view having the selected portions; and
computer usable program code configured to output the view,
wherein the multipage compilation of information is a multi-page table, and
wherein the selected portions include a first row of each of the multiple pages.

11. The computer program product of claim 10, wherein the multipage compilation of information is a search result or includes multiple web pages.

12. The computer program product of claim 10, wherein the selected portions further include a selectable number of first cells of each first row of the multiple pages.

13. The computer program product of claim 10, wherein the selected portions further include a first item, a middle item, and a last item of each of the multiple pages.

14. The computer program product of claim 10, further comprising computer usable program code configured to receive selection of an item in the view, and perform an action associated with selection of the item, wherein the selected portions are output in the view in a same graphical manner as they are output on the page associated therewith when the page associated therewith is output.

15. The computer program product of claim 10, wherein the request includes a fractional indication of how many portions to select relative to all portions in the multipage compilation, the fractional indication being shown on a slider, and wherein the computer usable program code configured to select portions of the multiple pages of the multipage compilation is further configured to select a maximum number of portions for the view, the portions being located at about uniform intervals in the multipage compilation.

16. The computer program product of claim 10, wherein the computer usable program code configured to select the portions of the multiple pages of the multipage compilation is further configured to select a maximum number of portions for the view, the portions being located at about uniform intervals in the multipage compilation.

17. The computer program product of claim 10, wherein the request includes a fractional indication of how many portions to select relative to all portions in the multipage compilation.

18. The computer program product of claim 10, wherein the selected portions comprise every nth line of each page of the multiple pages of the multipage compilation, and wherein the indication includes a value of n.

19. A method, comprising:
outputting one page of a multipage compilation of information;
receiving a request to show portions of multiple pages of the multipage compilation of information, the request originating from a user input device, the request including an indication of which portions of the multiple pages of the multipage compilation to select;
selecting the portions of the multiple pages of the multipage compilation of information according to the indication;
generating a view having the selected portions, wherein the multipage compilation of information is a multi-page table;
outputting the view to a graphical display device, wherein the selected portions output to the graphical display device include a selectable number of first cells of each first row of each of the multiple pages;

receiving selection of an item in the view, and performing an action associated with selection of the item, wherein the request includes an indication of the particular portions to select by designating at least one of:

an interval of the pages from which to select the portions;

an interval of the portions in the multipage compilation; and specific portions.

20. A computer program product for generating a view, the computer program product comprising:

a non-transitory computer usable medium having computer usable program code embodied therewith, the computer usable program code comprising:

computer usable program code configured to output one page of a multipage compilation of information;

computer usable program code configured to receive a request to show portions of multiple pages of the multipage compilation of information, the request originating from a user input device;

computer usable program code configured to select the portions of the multiple pages of the multipage compilation of information;

computer usable program code configured to generate a view having the selected portions;

computer usable program code configured to output the view to a graphical display device, wherein the selected portions output to the graphical display device include a first item, a middle item, and a last item of each of the multiple pages;

computer usable program code configured to receive selection of an item in the view, and performing an action associated with selection of the item, wherein the request includes an indication of particular portions to select by designating at least one of:

an interval of the pages from which to select the portions;

an interval of the portions in the multipage compilation; and specific portions.

* * * * *